United States Patent [19]

Gosselink

[11] Patent Number: 4,713,194

[45] Date of Patent: Dec. 15, 1987

[54] BLOCK POLYESTER AND LIKE COMPOUNDS HAVING BRANCHED HYDROPHILIC CAPPING GROUPS USEFUL AS SOIL RELEASE AGENTS IN DETERGENT COMPOSITIONS

[75] Inventor: Eugene P. Gosselink, Cincinnati, Ohio

[73] Assignee: The Procter & Gamble Company, Cincinnati, Ohio

[21] Appl. No.: 852,258

[22] Filed: Apr. 15, 1986

[51] Int. Cl.$^4$ .............................................. C11D 17/00
[52] U.S. Cl. ......................... 252/174.23; 252/174.21; 252/174.22; 252/DIG. 5; 252/DIG. 15; 560/91
[58] Field of Search ..................... 560/91; 252/174.23, 252/174.21, 174.22, DIG. 5, DIG. 15

[56] References Cited

U.S. PATENT DOCUMENTS

| | | | |
|---|---|---|---|
| 4,411,831 | 10/1983 | Robinson et al. | 252/DIG. 15 |
| 4,597,898 | 7/1986 | VanderMee | 252/174.23 |
| 4,664,848 | 5/1987 | Oh et al. | 252/174.23 |

*Primary Examiner*—Josephine L. Barr

*Attorney, Agent, or Firm*—Eric W. Guttag; Jerry J. Yetter; Steven J. Goldstein

[57] ABSTRACT

Block polyesters having branched hydrophilic capping groups which are useful as soil release agents in detergent compositions are disclosed. Preferred polyesters have the formula;

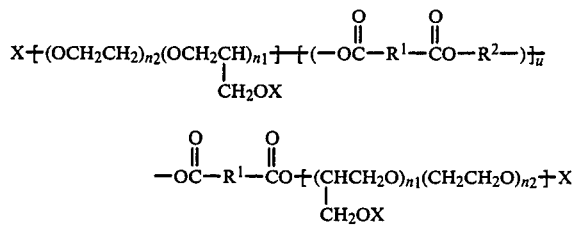

wherein each $R^1$ is a 1,4-phenylene moiety; the $R^2$ are essentially ethylene moieties, 1,2-propylene moieties or a mixture thereof; each X is ethyl or preferably methyl; each $n_1$ is from 1 to about 5; the sum of each $n_1+n_2$ is from about 12 to about 43; u is from about 3 to about 10.

35 Claims, No Drawings

BLOCK POLYESTER AND LIKE COMPOUNDS HAVING BRANCHED HYDROPHILIC CAPPING GROUPS USEFUL AS SOIL RELEASE AGENTS IN DETERGENT COMPOSITIONS

TECHNICAL FIELD

The present application relates to block polyesters and like compounds having branched hydrophilic capping groups which are useful as soil release agents in laundry detergent compositions.

In addition to cleaning performance, laundry detergent compositions desirably have other benefits. One is the ability to confer soil release properties to fabrics woven from polyester fibers. These fabrics are mostly co-polymers of ethylene glycol and terephthalic acid, and are sold under a number of tradenames, e.g. Dacron, Fortrel, Kodel and Blue C Polyester. The hydrophobic character of polyester fabrics makes their laundering difficult, particularly as regards oily soil and oily stains. The oily soil or stain preferentially "wets" the fabric. As a result, the oily soil or stain is difficult to remove in an aqueous laundering process.

High molecular weight (e.g., 40,000 to 50,000 M.W.) polyesters containing random ethylene terephthalate/polyethylene glycol (PEG) terephthalate units have been used as soil release compounds in laundry detergent compositions. See U.S. Pat. No. 3,962,152 to Nicol et al., issued June 8, 1976. During the laundering operation, these soil release polyesters adsorb onto the surface of fabrics immersed in the wash solution. The adsorbed polyester then forms a hydrophilic film which remains on the fabric after it is removed from the wash solution and dried. This film can be renewed by subsequent washing of the fabric with a detergent composition containing the soil release polyesters.

These ethylene terephthalate/PEG terephthalate polyesters are not very water-soluble. It is believed that they form a suspension in the wash solution which does not adsorb efficiently onto the fabrics. As a result, the level of soil release polyester in the detergent composition has to be increased if benefits are to be obtained after several wash cycles. Because of this poor water-solubility, these polyesters are formulated as suspensions in laundry detergent compositions, rather than as isotropic liquids. In certain detergent formulations, these polyesters can also diminish clay soil cleaning performance.

BACKGROUND ART

A. Polyester anti-static agents formed from dimethyl terephthalate, ethylene glycol and methoxy PEGs U.S. Pat. No. 3,416,952 to McIntyre et al., issued Dec. 17, 1968, discloses the treatment of shaped polyester articles with a water-insoluble crystallizable polymeric compound which can contain a water-solvatable polymeric group such as a polyoxyalkylene group having an average molecular weight of from 300–6000. Preferred polyoxyalkylene groups are the PEGs having an average molecular weight of from 1000–4000. Treatment of the shaped articles is carried out by applying an aqueous dispersion of the crystallizable polymeric compound in the presence of an anti-oxidant, followed by heating to a temperature above 90° C. to obtain a durable coating of the compound on the shaped article. Example 6 discloses one such crystallizable polymeric compound formed by the reaction of dimethyl terephthalate, ethylene glycol and an O-methyl poly(oxyethylene) glycol of average molecular weight 350. A 20% solution of this polyester in benzyl alcohol was used to impart anti-static properties to a polyester fabric. Example 7 discloses a 20% aqueous solution of a similar polyester used to impart anti-static properties to a polyester fabric.

B. Polyester anti-static and soil release agents formed from dimethyl terephthalate, sodium dimethyl 5-sulphoisophthalate, ethylene glycol and polyethylene glycol (PEG)

U.S. Pat. No. 4,427,557 to Stockburger, filed Feb. 15, 1983, issued Jan. 24, 1984, discloses low molecular weight copolyesters (M.W. 2,000 to 10,000) which can be used in aqueous dispersions to impart soil release properties to polyester fibers. The copolyesters are formed by the reaction of ethylene glycol, a PEG having an average molecular weight of 200 to 1000, an aromatic dicarboxylic acid (e.g. dimethyl terephthalate), and a sulfonated aromatic dicarboxylic acid (e.g. dimethyl 5-sulfoisophthalate). The PEG can be replaced in part with monoalkylethers of PEG such as the methyl, ethyl and butyl ethers. A dispersion or solution of the copolyester is applied to the textile material and then heat set at elevated temperatures (90° to 150° C.) to impart durable soil release properties.

C. Monomeric polyesters of PEG and terephthalic acid useful as soil release agents U.S. Pat. No. 4,349,688 to Sandler, issued Sept. 14, 1982, discloses polyoxyalkylene ester soil release agents, in particular monomeric polyesters of PEG and terephthalic acid having the formula:

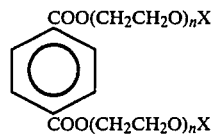

where n can range from 6–23 and X is either methyl or H. Example IV discloses the preparation of one such PEG/terephthalate polyester formed from terephthaloyl chloride and Carbowax 400 (n=9, X=H). Durable soil resistancy and water wicking properties are imparted by wetting the fabric with a composition containing the polyoxyalkylene ester, drying the wetted fabric, and then curing the dried fabric at a temperature of from 190°–200° C. for about 45–90 seconds.

D. Ethylene terephthalate/PEG terephthalate soil release polyesters for fabric treating solutions U.S. Pat. No. 3,959,230 to Hays, issued May 25, 1976, discloses polyester soil release agents containing random ethylene terephthalate/PEG terephthalate units in a mole ratio of from about 25:75 to about 35:65. These soil release polyesters have a molecular weight of from about 25,000 to about 55,000, (preferably from about 40,000 to about 55,000) and are used in dilute, aqueous solutions, preferably with an emulsifying agent present. Fabrics are immersed in this solution so that the soil release polyester adsorbs onto the fabric surface. The polyester forms a hydrophilic film which remains on the fibers after the fabric is removed from the solution and dried. See also U.S. Pat. No. 3,893,929 to Basadur, issued July 8, 1975 (compositions for imparting soil release finish containing a polyester having an average molecular weight of 3000–5000 formed from terephthalic acid, PEG and ethylene glycol); U.S. Pat. No. 3,712,873 to Zenk, issued Jan. 23, 1973 (textile treating composition comprising fatty alcohol polyethoxylates; quaternary ammonium compounds; a polyester having average molecular weight of 3000-5000 formed from terephthalic acid, PEG and ethylene glycol; and starch).

E. Ethylene terephthalate/PEG terephthalate soil release agents used in detergent compositions U.S. Pat. No. 3,962,152 to Nicol et al., issued June 8, 1976, discloses detergent compositions containing detergent surfactants and the ethylene terephthalate/PEG terephthalate soil release polyesters disclosed in the Hays patent. See also U.S. Pat. No. 4,116,885 to Derstadt et al., issued Sept. 26, 1978 (detergent compositions containing certain compatible anionic detergent surfactants and ethylene terephthalate/PEG terephthalate soil release polyesters); U.S. Pat. No. 4,132,680 to Nicol, issued Jan. 2, 1979 (detergent compositions containing detergent surfactants; a composition which disassociates to yield quaternary ammonium cations; and an ethylene terephthalate/PEG terephthalate soil release polyester).

F. Soil release and antistatic polyurethanes useful in detergent compositions which contain polyester blocks having sulfoisophthalate units U.S. Pat. No. 4,201,824 to Violland et al., issued May 6, 1980, discloses hydrophilic polyurethanes having soil release and antistatic properties useful in detergent compositions. These polyurethanes are formed from the reaction product of a base polyester with an isocyanate prepolymer (reaction product of diisocyanate and macrodiol). Example VI discloses a base polyester formed from dimethyl terephthalate, dimethyl sulfoisophthalate, ethylene glycol and PEG (molecular weight 300) which is reacted with a prepolymer formed from a PEG (molecular weight 1,500) and toluene diisocyanate.

DISCLOSURE OF THE INVENTION

The present invention relates to compounds of formula:

X—[(OCH₂CH(Y))ₙ(OR⁵)ₘ]—

—[(A—R¹—A—R²)ᵤ(A—R³—A—R²)ᵥ]—

—A—R⁴—A—[(R⁵O)ₘ(CH(Y)CH₂O)ₙ]—X wherein the A moieties are essentially

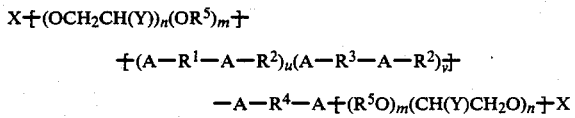

moieties; the $R^1$ moieties are essentially 1,4-phenylene moieties; the $R^2$ moieties are essentially ethylene moieties, or substituted ethylene moieties having $C_1$-$C_4$ alkyl or alkoxy substituents; the $R^3$ moieties are substituted $C_2$-$C_{18}$ hydrocarbylene moieties having at least one —SO₃M, —COOM, —O—[(R⁵O)ₘ(CH(Y)CH₂O)ₙ]—X or —A—[(R²—A—R⁴—A)]w[(R⁵O)ₘ(CH(Y)CH₂O)ₙ]—X substituent or at least one moiety —A—[(R²—A—R⁴—A)]w—R²—A— crosslinked to another $R^3$ moiety; the $R^4$ moieties are $R^1$ or $R^3$ moieties, or a mixture thereof; each $R^5$ is $C_3$-$C_4$ alkylene, or the moiety —R²—A—R⁶—, where $R^6$ is a $C_1$-$C_{12}$ alkylene, alkenylene, arylene or alkarylene moiety; each M is H or a water-soluble cation; the Y substituents of each moiety —[(R⁵O)ₘ(CH(Y)CH₂O)ₙ]— are the ether moiety —CH₂(OCH₂CH₂)ₚO—X or a mixture of this ether moiety and H; each X is H, $C_1$-$C_4$ alkyl or

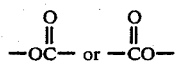

wherein $R^7$ is $C_1$-$C_4$ alkyl; m and n are numbers such that the moiety —(CH(Y)CH₂O)— comprises at least about 50% by weight of the moiety —[(R⁵O)ₘ(CH(Y)CH₂O)ₙ]—, provided that when $R^5$ is the moiety —R²—A—R⁶—, m is 1; each n is at least about 6; p is 0 or at least 1; u and v are numbers such that the sum of u+v is from about 3 to about 25 when w is 0; w is 0 or at least 1; and when w is at least 1, u, v and w are numbers such that the sum of u+v+w is from about 3 to about 25.

The present invention further relates to detergent compositions, especially for laundry use, which comprise a soil release component having an effective amount of these compounds. These detergent compositions further comprise from about 1 to about 75% by weight of a nonionic, anionic, ampholytic, zwitterionic, or cationic detergent surfactant, or mixture thereof. In addition to these detergent surfactants, the detergent compositions can optionally comprise from 0 to about 60% by weight of a detergent builder.

The compounds of the present invention provide excellent soil release benefits to polyester fabrics during laundering, but without diminishing the clay soil cleaning performance of the detergent composition. These compounds can be used at lower levels in detergent compositions to provide soil release benefits at least equivalent to prior art high molecular weight ethylene terephthalate/PEG terephthalate polyesters. Some of the compounds of the present invention can also be formulated to provide isotropic liquid detergent compositions.

Certain of the soil release compounds of the present invention provide additional through-the-wash static control benefits to laundered fabrics. The compounds of the present invention also provide cleaning benefits in terms of greasy/oily stain removal, as well as whiteness maintenance benefits. In addition, it is expected that the soil release compounds of the present invention will be more biodegradable than prior art ethylene terephthalate/PEG terephthalate soil release polyesters.

SOIL RELEASE COMPOUNDS

The compounds of the present invention have the formula:

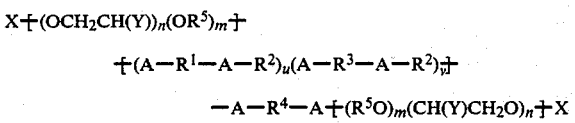

In this formula, the moiety —[(A—R¹—A—R²)ᵤ(A—R³—A—R²)ᵥ]—A—R⁴—A— forms the oligomer or polymer backbone of the compounds. It is believed that the structure of the backbone is what is important to the adsorption of the compounds on polyester fabrics during laundering. Groups X—[(OCH₂CH(Y))ₙ(OR⁵)ₘ]— and —[(R⁵O)ₘ(CH(Y)CH₂O)ₙ]—X are generally connected at the ends of the oligomer/polymer backbone. It is believed that the soil release properties of the compounds (when absorbed on the fabric) are due to these hydrophilic end groups.

The linking A moieties are essentially

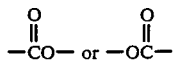

moieties, i.e. the compounds of the present invention are polyesters. As used herein, the term "the A moieties are essentially

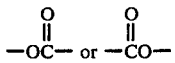

moieties" refers to compounds where the A moieties consist entirely of moieties

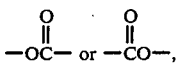

or are partially substituted with linking moieties such as

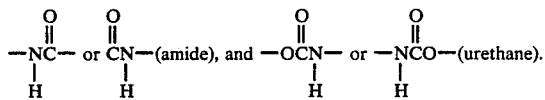

The degree of partial substitution with these other linking moieties should be such that the soil release properties are not adversely affected to any great extent. Preferably, linking moieties A consist entirely of (i.e., comprise 100%) moieties

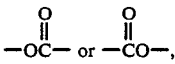

i.e., each A is either

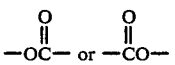

The $R^1$ moieties are essentially 1,4-phenylene moieties. As used herein, the term "the $R^1$ moieties are essentially 1,4-phenylene moieties" refers to compounds where the $R^1$ moieties consist entirely of 1,4-phenylene moieties, or are partially substituted with other arylene or alkarylene moieties, alkylene moieties, alkenylene moieties, or mixtures thereof. Arylene and alkarylene moieties which can be partially substituted for 1,4-phenylene include 1,3-phenylene, 1,2-phenylene, 1,8-naphthylene, 1,4-naphthylene, 2,2-biphenylene, 4,4'-biphenylene and mixtures thereof. Alkylene and alkenylene moieties which can be partially substituted include ethylene, 1,2-propylene, 1,4-butylene, 1,5-pentylene, 1,6-hexamethylene, 1,7-heptamethylene, 1,8-octamethylene, 1,4-cyclohexylene, and mixtures thereof.

For the $R^1$ moieties, the degree of partial substitution with moieties other than 1,4-phenylene should be such that the soil release properties of the compound are not adversely affected to any great extent. Generally, the degree of partial substitution which can be tolerated will depend upon the backbone length of the compound, i.e., longer backbones can have greater partial substitution for 1,4-phenylene moieties. Usually, compounds where the $R^1$ comprise from about 50 to 100% 1,4-phenylene moieties (from 0 to about 50% moieties other than 1,4-phenylene) have adequate soil release activity. For example, polyesters made according to the present invention with a 40:60 mole ratio of isophthalic (1,3-phenylene) to terephthalic (1,4-phenylene) acid have adequate soil release activity. However, because most polyesters used in fiber making comprise ethylene terephthalate units, it is usually desirable to minimize the degree of partial substitution with moieties other than 1,4-phenylene for best soil release activity. Preferably, the $R^1$ moieties consist entirely of (i.e., comprise 100%) 1,4-phenylene moieties, i.e. each $R^1$ moiety is 1,4-phenylene.

The $R^2$ moieties are essentially ethylene moieties, or substituted ethylene moieties having $C_1$–$C_4$ alkyl or alkoxy substituents. As used herein, the term "the $R^2$ moieties are essentially ethylene moieties, or substituted ethylene moieties having $C_1$–$C_4$ alkyl or alkoxy substituents" refers to compounds of the present invention where the $R^2$ moieties consist entirely of ethylene, or substituted ethylene moieties, or are partially substituted with other compatible moieties. Examples of these other moieties include linear $C_3$–$C_6$ alkylene moieties such as 1,3-propylene, 1,4-butylene, 1,5-pentylene or 1,6-hexamethylene, 1,2-cycloalkylene moieties such as 1,2-cyclohexylene, 1,4-cycloalkylene moieties such as 1,4-cyclohexylene and 1,4-dimethylenecyclohexylene, polyoxyalkylated 1,2-hydroxyalkylenes such as

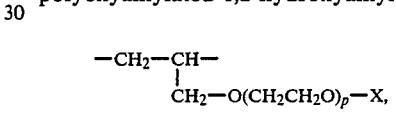

and oxyalkylene moieties such as

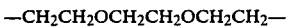

or

For the $R^2$ moieties, the degree of partial substitution with these other moieties should be such that the soil release properties of the compounds are not adversely affected to any great extent. Generally, the degree of partial substitution which can be tolerated will depend upon the backbone length of the compound, i.e., longer backbones can have greater partial substitution. Usually, compounds where the $R^2$ comprise from about 20 to 100% ethylene, or substituted ethylene moieties (from 0 to about 80% other compatible moieties) have adequate soil release activity. For example, polyesters made according to the present invention with a 75:25 mole ratio of diethylene glycol (—CH$_2$CH$_2$OCH$_2$CH$_2$—) to ethylene glycol (ethylene) have adequate soil release activity. However, it is desirable to minimize such partial substitution, especially with oxyalkylene moieties, for best soil release activity. (During the making of polyesters according to the present invention, small amounts of these oxyalkylene moieties (as dialkylene glycols) are typically formed from glycols in side reactions and are then incorporated into the polyester). Preferably, $R^2$ comprises from about 80 to 100% ethylene, or substituted ethylene moieties, and from 0 to about 20% other compatible moieties.

For the $R^2$ moieties, suitable ethylene or substituted ethylene moieties include ethylene, 1,2-propylene, 1,2- butylene, 1,2-hexylene, 3-methoxy-1,2-propylene and mixtures thereof. Preferably, the $R^2$ moieties are essentially ethylene moieties, 1,2-propylene moieties or mixtures thereof. Inclusion of a greater percentage of ethylene moieties tends to improve the soil release activity of the compounds. Surprisingly, inclusion of a greater percentage of 1,2-propylene moieties tends to improve the water solubility of the compounds.

For the $R^3$ moieties, suitable substituted $C_2$-$C_{18}$ hydrocarbylene moieties can include substituted $C_2$-$C_{12}$ alkylene, alkenylene, arylene, alkarylene and like moieties. The substituted alkylene or alkenylene moieties can be linear, branched, or cyclic. Also, the $R^3$ moieties can be all the same (e.g. all substituted arylene) or a mixture (e.g. a mixture of substituted arylenes and substituted alkylenes). Preferred $R^3$ moieties are those which are substituted 1,3-phenylene moieties.

The substituted $R^3$ moieties preferably have only one $-SO_3M$, $-COOM$, $-O-(R^5O)_m(CH(Y)CH_2O)_n\}-X$ or $-A\{-(R^2-A-R^4-A)\}_w\{-(R^5O)_m(CH(Y)CH_2O)_n\}-X$ substituent. M can be H or any compatible water-soluble cation. Suitable water soluble cations include the water soluble alkali metals such as potassium ($K^+$) and especially sodium ($Na^+$), as well as ammonium ($NH_4^+$). Also suitable are substituted ammonium cations having the formula:

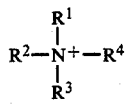

where $R^1$ and $R^2$ are each a $C_1$-$C_{20}$ hydrocarbyl group (e.g. alkyl, hydroxyalkyl) or together form a cyclic or heterocyclic ring of from 4 to 6 carbon atoms (e.g. piperidine, morpholine); $R^3$ is a $C_1$-$C_{20}$ hydrocarbyl group; and $R^4$ is H (ammonium) or a $C_1$-$C_{20}$ hydrocarbyl group (quat amine). Typical substituted ammonium cationic groups are those where $R^4$ is H (ammonium) or $C_1$-$C_4$ alkyl, especially methyl (quat amine); $R^1$ is $C_{10}$-$C_{18}$ alkyl, especially $C_{12}$-$C_{14}$ alkyl; and $R^2$ and $R^3$ are each $C_1$-$C_4$ alkyl, especially methyl.

The $R^3$ moieties having $-A\{-(R^2-A-R^4-A)\}_w\{-(R^5O)_m(CH(Y)CH_2O)_n\}-X$ substituents provide branched backbone compounds. $R^3$ moieties having $-A-(R^2-A-R^4-A)]_wR^2-A$ moieties provide crosslinked backbone compounds. Indeed, syntheses used to make the branched backbone compounds typically provide at least some crosslinked backbone compounds.

The moieties $-(R^5O)-$ and $-(CH(Y)CH_2O)-$ of the moieties $\{-(R^5O)_m(CH(Y)CH_2O)_n\}-$ and $\{-(OCH(Y)CH_2)_n(OR^5)_m\}-$ can be mixed together or preferably form blocks of $-(R^5O)-$ and $-(CH(Y)CH_2O)-$ moieties. Preferably, the blocks of $-(R^5O)-$ moieties are located next to the backbone of the compound. When $R^5$ is the moiety $-R^2-A-R^6-$, m is 1; also, the moiety $-R^2-A-R^6-$ is preferably located next to the backbone of the compound. For $R^5$, the preferred $C_3$-$C_4$ alkylene is $C_3H_6$ (propylene); when $R^5$ is $C_3$-$C_4$ alkylene, m is preferably from 0 to about 5 and is most preferably 0. $R^6$ is preferably methylene or 1,4-phenylene. The moiety $-(CH(Y)CH_2O)-$ preferably comprises at least about 75% by weight of the moiety $\{-(R^5O)_m(CH(Y)CH_2O)_n\}-$ and most preferably 100% by weight (m is 0).

The Y substituents of each moiety $\{-(R^5O)_m(CH(Y)CH_2O)_n\}-$ are the ether moiety $-CH_2(OCH_2CH_2)_pO-X$, or are, more typically, a mixture of this ether moiety and H; p can range from 0 to 100, but is typically 0. When the Y substituents are a mixture, moiety $-(CH(Y)CH_2O)_n-$ can be represented by the following moiety:

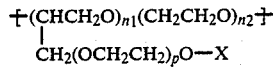

wherein $n_1$ is at least 1 and the sum of $n_1+n_2$ is the value for n. Typically, $n_1$ has an average value of from about 1 to about 10. The moieties

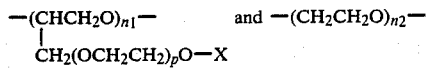

can be mixed together, but typically form blocks of

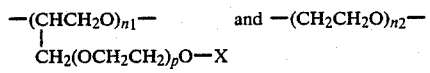

moieties. X can be H, $C_1$-$C_4$ alkyl or

wherein $R^7$ is $C_1$-$C_4$ alkyl. X is preferably methyl or ethyl, and most preferably methyl. The value for each n is at least about 6, but is preferably at least about 10. The value for each n usually ranges from about 12 to about 113. Typically, the value for each n is in the range of from about 12 to about 43.

The backbone moieties $\{-A-R^1-A-R^2-\}$ and $\{-A-R^3-A-R^2-\}$ can be mixed together or can form blocks of $\{-A-R^1-A-R^2-\}$ and $\{-A-R^3-A-R^2-\}$ moieties. It has been found that the value of u+v needs to be at least about 3 in order for the compounds of the present invention to have significant soil release activity. The maximum value for u+v is generally determined by the process by which the compound is made, but can range up to about 25, i.e. the compounds of the present invention are oligomers or low molecular weight polymers. By comparison, polyesters used in fiber making typically have a much higher molecular weight, e.g. have from about 50 to about 250 ethylene terephthalate units. Typically, the sum of u+v ranges from about 3 to about 10 for the compounds of the present invention.

Generally, the larger the u+v value, the less soluble is the compound, especially when the $R^3$ moieties do not have the substituents $-COOM$ or $-SO_3M$. Also, as the value for n increases, the value for u+v should be increased so that the compound will deposit better on the fabric during laundering. When the $R^3$ moieties have the substituent $-A\{-(R^2-A-R^4-A)\}_w\{-(R^5O)_m(CH(Y)CH_2O)_n\}-X$ (branched backbone compounds) or $\{-A-(R^2-A-R^4-A)\}_wR^2-A-$ (crosslinked backbone compounds), the value for w is typically at least 1 and is determined by the process by which the compound is made. For these branched and crosslinked backbone compounds the value for u+v+w is from about 3 to about 25.

Preferred compounds of the present invention are block polyesters having the formula:

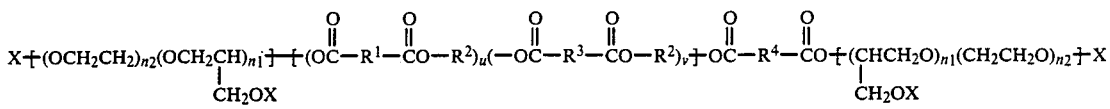

wherein the $R^1$ moieties are all 1,4-phenylene moieties; the $R^2$ moieties are essentially ethylene moieties, 1,2-propylene moieties or mixtures thereof; the $R^3$ moieties are all potassium or preferrably sodium 5-sulfo-1,3-phenylene moieties or substituted 1,3-phenylene moieties having the substituent

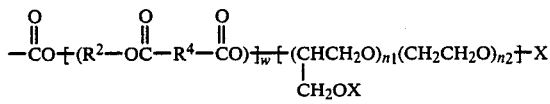

at the 5 position; the $R^4$ moieties are $R^1$ or $R^3$ moieties, or mixtures thereof; each X is ethyl or preferably methyl; each $n_1$ is from 1 to about 5; the sum of each $n_1+n_2$ is from about 12 to about 43; when w is 0, u+v is from about 3 to about 10; when w is at least 1, u+v+w is from about 3 to about 10.

Particularly preferred block polyesters are those where v is 0, i.e. the linear block polyesters. For these most preferred linear block polyesters, u typically ranges from about 3 to about 8. The most water soluble of these linear block polyesters are those where u is from about 3 to about 5.

METHOD FOR MAKING COMPOUNDS

The compounds of the present invention can be prepared by art-recognized methods. Although the following synthesis description is for the preferred block polyesters of the present invention, other versions can be prepared by appropriate variation.

The block polyesters of the present invention are typically formed from: (1) ethylene glycol, 1,2-propylene glycol or a mixture thereof; (2) a capping group formed from the reaction of the appropriate glycidyl ether with a polyethylene glycol (PEG) capped at one end with a $C_1$-$C_4$ alkyl group; (3) a dicarboxylic acid (or its diester); and optionally (4) an alkali metal salt of a sulfonated aromatic dicarboxylic acid (or its diester), or if branched polyesters are desired, a polycarboxylic acid (or its ester). The respective amounts of these four components are selected to prepare polyesters having the desired properties in terms of solubility and soil release properties.

The capped PEG used to prepare the capping group is typically methyl capped and can be formed by ethoxylation of the respective alcohol with ethylene oxide. Also, methyl capped PEGs are commercially available from Union Carbide under the trade name Methoxy Carbowax and from Aldrich Chemical Company under the name poly(ethylene glycol)methyl ether. These commercial methyl capped PEGs have molecular weights of 350 (n=about 7.5), 550 (n=about 12), 750 (n=about 16), 2000 (n=about 45), and 5000 (n=about 113). The capped PEG, or more typically its alkali metal ($Na^+$ or $K^+$) alkoxide, are reacted with a glycidyl ether to form the capping group used in preparing the polyesters of the present invention. See Flores-Gallardo et al, "Epoxy Ethers and Ether Amino Alcohols", *J. Org. Chem.*, Vol. 12, (1947), pp 831-33, which describes a method for preparing glycidyl ethers useful in the present invention.

A representative synthesis of one such capping group is as follows:

STEP 1

1-methoxy-2-hydroxy-3-chloropropane

Into a 2-l., three-necked, round bottom flask, fitted with a condenser, addition funnel, and magnetic stirrer were placed 730 ml (18 moles) of methanol and 16.0 ml (0.25 moles) of methanesulfonic acid. To this refluxing mixture was added dropwise 496 ml (6.0 moles) of epichlorohydrin. The reaction mixture was stirred and refluxed for 18 hrs. After cooling to room temperature, 37.3 g (0.27 moles) of $K_2CO_3$ was added to the reaction mixture which was then stirred for 2 hrs. The filtrate was distilled at atmospheric pressure to remove methanol, then at reduced pressure (50°–55° C.) to obtain 268 g (36% yield) of product.

The NMR spectrum of the product included the expected absence of epoxide resonances and the addition of a methoxy resonance. The remaining two methylene, methine, and alcohol resonances were as expected for 1-methoxy-2-hydroxy-3-chloropropane.

STEP 2

1,2-epoxy-3-methoxypropane

Into a 2-l., three-necked, round bottom flask, fitted with a condenser, and mechanical stirrer were placed 200.2 g (1.6 moles) of the 1-methoxy-2-hydroxy-3-chloropropane from Step 1 and 1.6 l. of diethyl ether. The flask was immersed in an ice-water bath, and 96.0 g (2.4 moles) of NaOH was then added in small portions over a 2.5 hr. period to the vigorously stirred reaction mixture. The reaction mixture was allowed to warm to room temperature and was stirred overnight. The ether phase was then washed with $H_2O$ (2×100 ml). The combined aqueous extracts were washed once with 200 ml of diethyl ether. The combined diethyl ether extracts were dried with $Na_2SO_4$. The dried extracts were distilled at atmospheric pressure to remove diethyl ether, then under reduced pressure (35° C.) to obtain 93.5 g (67% yield) of product.

The NMR spectrum of the product included the expected epoxide, methoxy and the methylene resonances for 1,2-epoxy-3-methoxypropane.

STEP 3

Reaction of 1,2-epoxy-3-methoxypropane and poly(ethylene glycol)methyl ether to form capping group Into a 250 ml, three-necked, round bottom flask, fitted with a condenser, addition funnel, and magnetic stirrer were placed 175.0 g (0.5 moles) of poly(ethylene glycol)methyl ether (M.W. 350) and 1.1 g (0.05 moles) of NaH. The mixture was stirred vigorously and heated to 80° C. under an argon atmosphere for 15 minutes. Then 88.4 g of the 1,2-epoxy-3-methoxy propane from Step 2 was added dropwise over a 6 hr. period. This reaction mixture was heated at 90° C. for 30 hrs. During this time, an additional 4.0 g (0.2 moles) of NaH was added periodically in small portions to maintain a pH of 10-11. (It is believed that some of the alkoxide generated by the NaH was consumed by a small amount of residual chlorosubstituted materials in the 1,2-epoxy-3-methoxypropane).

The reaction mixture was monitored by H-NMR and was considered complete following the absence of epoxide resonances. After 30 hours, the reaction mixture was allowed to cool to room temperature and 10.2 g (0.2 moles) of acetic acid was then added to neutralize the mixture. The reaction mixture was stirred for 15 minutes, then excess acetic acid was removed on a Kugelrohr evaporator at 100° C. for 5.5 hrs. This resulted in 255.1 g (97% yield) of product.

The NMR spectrum of the product containing the capping group included the expected resonances for the methoxy and ethoxylate groups, and the absence of epoxide resonances.

Preferably, the only dicarboxylic acid used is terephthalic acid or its diester. However, minor amounts of other aromatic dicarboxylic acids (or their diesters), or aliphatic dicarboxylic acids (or their diesters) can be included to the extent that the soil release properties are substantially maintained. Illustrative examples of other aromatic dicarboxylic acids which can be used include isophthalic acid, phthalic acid, naphthalene dicarboxylic acids, anthracene dicarboxylic acids, biphenyl dicarboxylic acids, oxydibenzoic acids and the like, as well as mixtures of these acids. If aliphatic dicarboxylic acids are included, adipic, glutaric, succinic, trimethyladipic, pimelic, azelaic, sebacic, suberic, 1,4-cyclohexane dicarboxylic acid and/or dodecanedioic acids can be used.

Illustrative examples of sulfonated aromatic dicarboxylic acids which can be used to prepare polyesters of the present invention include the alkyl metal salts of benzene-2,5-dicarboxy sulfonate, 2-naphthyl-dicarboxybenzene sulfonate, 1-naphthyldicarboxy-benzene sulfonate, phenyl-dicarboxy benzene sulfonate, 2,6-dimethyl phenyl-3,5-dicarboxy benzene sulfonate and phenyl-3,5-dicarboxy-benzene sulfonate. The preferred sulfonated salt is the 5-sulfoisophthalic acid sodium salt or its diester. If branched polyesters are desired, a minor amount of a polycarboxylic acid (or its diester) selected from trimesic acid, trimellitic acid, hemimellitic acid, pyromellitic acid, and mixtures thereof can be used.

The preferred method for preparing block polyesters of the present invention comprises reacting the desired mixture of lower dialkyl esters (methyl, ethyl, propyl or butyl) of the dicarboxylic acid with a mixture of the glycol (ethylene glycol, 1,2-propylene glycol or a mixture thereof) and the capping group. The glycol esters and oligomers produced in this ester interchange reaction are then polymerized to the desired degree. The ester interchange reaction can be conducted in accordance with reaction conditions generally used for ester interchange reactions. This ester interchange reaction is usually conducted at temperatures of from 120° to 220° C. in the presence of an esterification catalyst. Alcohol is formed and constantly removed thus forcing the reaction to completion. The temperature and pressure of the reaction are desirably controlled so that glycol does not distill from the reaction mixture. Higher temperatures can be used if the reaction is conducted under pressure.

The catalysts used for the ester interchange reaction are those well known to the art. These catalysts include alkyl and alkaline earth metals, for example lithium, sodium, calcium, and magnesium, as well as transition and Group II B metals, for example antimony, manganese, cobalt, and zinc, usually as the respective oxides, carbonates, or acetates. Typically, antimony trioxide and calcium acetate are used.

The extent of the ester interchange reaction can be monitored by the amount of alcohol liberated or the disappearance of the dialkyl esters of the dibasic acids in the reaction mixture as determined by high performance liquid chromatography (HPLC) or any other suitable method. The ester interchange reaction is desirably taken to more than 90% completion. Greater than 95% completion is preferred in order to decrease the amount of sublimates obtained in the polymerization step.

If desired, stabilizers such as phosphorus and phosphoric acid and esters thereof can be added at the end of the ester interchange step. The purpose of the stabilizer is to inhibit degradation, oxidation, and other side reactions; to destroy the catalytic activity of the ester interchange catalyst; and to prevent precipitation of insoluble metal carboxylates. Typically, stabilizers are not used to make the polyesters of the present invention.

When the ester interchange reaction is complete, the glycol ester products are then polymerized to produce polyesters. The desired degree of polymerization can be determined by HPLC and $^{13}$C-NMR analysis. For commercial processes, the polymerization reaction is usually conducted at temperatures of from about 200° to about 280° C. in the presence of a catalyst. Higher temperatures can be used but tend to produce darker colored products. Illustrative examples of catalysts useful for the polymerization step include antimony trioxide, germanium dioxide, titanium alkoxide, hydrated antimony pentoxide, and ester interchange catalysts such the as salts of zinc, cobalt, and maganese.

Excess glycol and other volatiles liberated during the reaction are removed under vacuum. The reaction is continued until polymerization is nearly complete based on analysis by $^{13}$C-NMR and/or reverse phase HPLC and/or gel phase permeation. In addition to the desired polyesters, the crude composition obtained after synthesis contains starting reactants, as well as intermediate products.

Representative examples of specific block polyesters formed according to the present invention are as follows:

EXAMPLE 1

In a 250 ml, three-necked, round bottom flask, fitted with a magnetic stirrer and a modified claisen head (to support a condenser and receiver flask) is placed 10.6 g (0.17 moles) of ethylene glycol, and 0.4 g (0.5% w/w) of Sb$_2$O$_3$ catalyst. This mixture is heated to 150° C. for 1 hr. to predissolve the catalyst and then cooled to room temperature. Then, 49.9 g (0.095 moles of the capping group (reaction product of 1,2-epoxy-3-methoxy propane and poly(ethyleneglycol)methyl ether of M.W. 350), 25.2 g (0.13 moles) of dimethyl terephthalate, and 0.1 g (0.1% w/w) of butylated hydroxytoluene is added. The reaction mixture is heated under argon to 180° C. over a 2 hr. period and then held at 180° C. for 23 hrs. During this time, 8.0 g (96% of theoretical value) of methanol is distilled from the reaction mixture. The reaction mixture is then cooled to room temperature, placed in a vacuum, heated to 200° C. over a period of 1 hr., and then held at 200° C. for 5 hrs. The reaction is determined to be complete by using $^{13}$C-NMR.

EXAMPLE 2

A polyester is prepared by substituting 1,2-propylene glycol for ethylene glycol, using reaction conditions similar to those of Example 1.

Method for Determining Degree of Polymerization

A method for determining the degree of polymerization of the polyesters of the present invention involves: (1) alcohol fractionation of the crude polyester composition obtained after synthesis: (2) high performance liquid chromatographic (HPLC) separation of the methanol soluble fraction to yield additional fractions; and (3) $^{13}$C-NMR analysis to determine backbone length (i.e. value for u) of the polyesters present in each of the various HPLC fractions. See U.S. application Ser. No. 801,020 to Eugene P. Gosselink, filed Nov. 22, 1985, pages 18–23 (herein incorporated by reference), which provides a detailed description of this method for determining the degree of polymerization of similar polyesters.

DETERGENT COMPOSITIONS

Soil Release Component

The compounds of the present invention are particularly useful in detergent compositions to provide soil release properties. These compositions can be used as laundry detergents, laundry additives, and laundry pretreatments.

The detergent compositions of the present invention comprise a soil release component which contains an effective amount of the soil release compounds previously defined. What is an "effective amount" will depend upon the particular soil release compounds used, the particular type of detergent formulation (liquid, granular, etc.) and the benefits desired. Usually, the soil release compounds are effective when included in an amount from about 0.01 to about 10% by weight of the composition. In terms of soil release benefits, preferred detergent compositions can comprise from about 0.1 to about 5% by weight of the soil release compounds, but typically comprise from about 0.3 to about 3% by weight of these compounds.

For granular detergent formulations, the soil release component typically comprises the soil release compounds, plus any protective enrobing material. In making granular detergent formulations, the soil release compounds could be exposed to highly alkaline materials such as NaOH and KOH. The soil release compounds, in particular those having shorter backbones, can be degraded by alkaline environments, especially those above a pH of about 8.5. Accordingly, the soil release compounds are preferably enrobed in a material which protects them from the alkaline environment of a granular detergent formulation yet permits the soil release compounds to be dispersed in the laundering operation.

Suitable enrobing materials include the nonionic surfactants, polyethylene glycols (PEG), fatty acids, fatty acid esters of alcohols, diols and polyols, anionic surfactants, film forming polymers and mixtures of these materials. Examples of suitable nonionic surfactant enrobing materials are described in the Detergent Surfactant section of this application. Examples of suitable PEG enrobing materials are those having an average M.W. of from about 2,000 to 15,000, preferably from about 3,000 to about 10,000 and most preferably from about 4,000 to about 8,000. Examples of suitable fatty acid enrobing materials are the higher fatty acids having from 12 to 18 carbon atoms. Examples of suitable fatty acid ester enrobing materials include the sorbitan fatty acid esters (e.g. sorbitan monolaurate). Other examples of suitable enrobing materials, including anionic surfactants and film forming polymers, are disclosed in U.S. Pat. No. 4,486,327 to Murphy et al., issued Dec. 4, 1984, which is incorporated by reference. The soil release compounds can be enrobed according to the methods disclosed in this Murphy et al. patent.

For liquid detergent formulations, the soil release component can be comprised entirely of soil release compounds or can further include a water-soluble organic solvent or an hydrotrope to aid in dissolving the soil release compounds. Suitable organic solvents are usually aromatic and can include ethyl benzoate, phenoxyethanol, methyl-o-toluate, 2-methoxybenzyl alcohol and pyrrolidone. Suitable hydrotropes include the methyl capped PEGs and shorter backbone block polyesters, i.e. where u is 0 to 2. While these short backbone block polyesters do not have any significant soil release activity, they are water-soluble. Accordingly, these short backbone polyesters function as hydrotropes for the longer backbone, water-insoluble polyesters which have soil release activity.

The amount, or even need for, organic solvents or hydrotropes to prepare liquid detergent formulations containing the soil release compounds of the present invention will depend upon the compounds used, especially what fraction thereof is water-soluble, the ingredients present in the laundry detergent system, and whether an isotropic, homogeneous liquid is desired. For isotropic liquid detergent formulations, the soil release compounds need to be dissolved as much as possible which sometimes requires the use of organic solvents or hydrotropes. Also, it has been found that dissolving the compounds in the liquid detergent formulations makes them more effective as soil release agents.

Besides organic solvents or hydrotropes, greater amounts of water-soluble soil release compounds can be included in the soil release component to aid in the preparation of isotropic liquid detergent formulations. For example, soil release polyesters with backbones having from about 3 to about 5 (u=about 3 to about 5) 1,2-propylene terephthalate units and having a capping group at each end based on a methyl capped PEG (M.W. 350) and a methoxy glycidyl ether reaction product are water-soluble. In addition, soil release polyesters prepared from dimethyl terephthalate, 1,2-propylene glycol and the capping group typically contain a substantial fraction of water-soluble polyesters (both active and inactive types) which aid in dissolving less water-soluble soil release polyesters in the liquid detergent formulation. Partial or total inclusion of 1,2-propylene glycol generally increases the solubility of the soil release polyesters. The more water-soluble 1,2-propylene glycol based soil release polyesters are particularly useful in making isotropic liquid detergent formulations which have a large number of ingredients and low water content.

Detergent Surfactants

The amount of detergent surfactant included in the detergent compositions of the present invention can vary from about 1 to about 75% by weight of the composition depending upon the detergent surfactant(s) used, the type of composition to be formulated (e.g.

granular, liquid) and the effects desired. Preferably, the detergent surfactant(s) comprises from about 10 to about 50% by weight of the composition, and most preferably from about 15 to about 40% by weight. The detergent surfactant can be nonionic, anionic, ampholytic, zwitterionic, cationic, or a mixture thereof:

A. Nonionic Surfactants

Suitable nonionic surfactants for use in detergent compositions of the present invention are generally disclosed in U.S. Pat. No. 3,929,678 to Laughlin et al., issued Dec. 30, 1975 at column 13, line 14 through column 16, line 6 (herein incorporated by reference). Classes of nonionic surfactants included are:

1. The polyethylene oxide condensates of alkyl phenols. These compounds include the condensation products of alkyl phenols having an alkyl group containing from about 6 to 12 carbon atoms in either a straight chain or branched chain configuration with ethylene oxide, the ethylene oxide being present in an amount equal to 5 to 25 moles of ethylene oxide per mole of alkyl phenol. The alkyl substituent in such compounds can be derived, for example, from polymerized propylene, diisobutylene, and the like. Examples of compounds of this type include nonyl phenol condensed with about 9.5 moles of ethylene oxide per mole of nonyl phenol; dodecylphenol condensed with about 12 moles of ethylene oxide per mole of phenol; dinonyl phenol condensed with about 15 moles of ethylene oxide per mole of phenol; and diisooctyl phenol condensed with about 15 moles of ethylene oxide per mole of phenol. Commercially available nonionic surfactants of this type include Igepal CO-630, marketed by the GAF Corporation, and Triton X-45, X-114, X-100, and X-102, all marketed by the Rohm & Haas Company.

2. The condensation products of aliphatic alcohols with from about 1 to about 25 moles of ethylene oxide. The alkyl chain of the aliphatic alcohol can either be straight or branched, primary or secondary, and generally contains from about 8 to about 22 carbon atoms. Examples of such ethoxylated alcohols include the condensation product of myristyl alcohol condensed with about 10 moles of ethylene oxide per mole of alcohol; and the condensation product of about 9 moles of ethylene oxide with coconut alcohol (a mixture of fatty alcohols with alkyl chains varying in length from 10 to 14 carbon atoms). Examples of commercially available nonionic surfactants of this type include Tergitol 15-S-9, marketed by Union Carbide Corporation, Neodol 45-9, Neodol 23-6.5, Neodol 45-7, and Neodol 45-4, marketed by Shell Chemical Company, and Kyro EOB, marketed by The Procter & Gamble Company.

3. The condensation products of ethylene oxide with a hydrophobic base formed by the condensation of propylene oxide with propylene glycol. The hydrophobic portion of these compounds has a molecular weight of from about 1500 to 1800 and exhibits water insolubility. The addition of polyoxyethylene moieties to this hydrophobic portion tends to increase the water solubility of the molecule as a whole, and the liquid character of the product is retained up to the point where the polyoxyethylene content is about 50% of the total weight of the condensation product, which corresponds to condensation with up to about 40 moles of ethylene oxide. Examples of compounds of this type include certain of the commercially available Pluronic surfactants, marketed by Wyandotte Chemical Corporation.

4. The condensation products of ethylene oxide with the product resulting from the reaction of propylene oxide and ethylenediamine. The hydrophobic moiety of these products consists of the reaction product of ethylenediamine and excess propylene oxide, the moiety having a molecular weight from about 2500 to about 3000. This hydrophobic moiety is condensed with ethylene oxide to the extent that the condensation product contains from about 40% to about 80% by weight of polyoxyethylene and has a molecular weight of from about 5,000 to about 11,000. Examples of this type of nonionic surfactant include certain of the commercially available Tetronic compounds, marketed by Wyandotte Chemical Corporation.

5. Semi-polar nonionic detergent surfactants which include water-soluble amine oxides containing one alkyl moiety of from about 10 to 18 carbon atoms and 2 moieties selected from the group consisting of alkyl groups and hydroxyalkyl groups containing from 1 to about 3 carbon atom; water-soluble phosphine oxides containing one alkyl moiety of from about 10 to 18 carbon atoms and 2 moieties selected from the group consisting of alkyl groups and hydroxyalkyl groups containing from about 1 to 3 carbon atoms; and water-soluble sulfoxides containing one alkyl moiety of from about 10 to 18 carbon atoms and a moiety selected from the group consisting of alkyl and hydroxyalkyl moieties of from about 1 to 3 carbon atoms.

Preferred semi-polar nonionic detergent surfactants are the amine oxide detergent surfactants having the formula

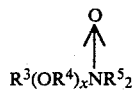

wherein $R^3$ is an alkyl, hydroxyalkyl, or alkyl phenyl group or mixtures thereof containing from about 8 to about 22 carbon atoms; $R^4$ is an alkylene or hydroxyalkylene group containing from 2 to 3 carbon atoms or mixtures thereof; x is from 0 to about 3; and each $R^5$ is an alkyl or hydroxyalkyl group containing from 1 to about 3 carbon atoms or a polyethylene oxide group containing from one to about 3 ethylene oxide groups. The $R^5$ groups can be attached to each other, e.g., through an oxygen or nitrogen atom to form a ring structure.

Preferred amine oxide detergent surfactants are $C_{10}$-$C_{18}$ alkyl dimethyl amine oxide and $C_8$-$C_{12}$ alkoxy ethyl dihydroxy ethyl amine oxide.

6. Alkylpolysaccharides disclosed in European Patent Application No. 70,074 to Ramon A. Llenado, published Jan. 19, 1983, having a hydrophobic group containing from about 6 to about 30 carbon atoms, preferably from about 10 to about 16 carbon atoms and a polysaccharide, e.g., a polyglycoside, hydrophilic group containing from about 1½ to about 10, preferably from about 1½ to about 3, most preferably from about 1.6 to about 2.7 saccharide units. Any reducing saccharide containing 5 or 6 carbon atoms can be used, e.g. glucose, galactose and galactosyl moieties can be substituted for the glucosyl moieties. (Optionally the hydrophobic group is attached at the 2, 3, 4, etc. positions thus giving a glucose or galactose as opposed to a glucoside or galactoside.) The intersaccharide bonds can be, e.g., between the one position of the additional saccharide units and the 2-, 3-, 4-, and/or 6 positions on the preceding saccharide units.

Optionally, and less desirably, there can be a polyalkyleneoxide chain joining the hydrophobic moiety and the polysaccharide moiety. The preferred alkyleneoxide is ethylene oxide. Typical hydrophobic groups include alkyl groups, either saturated or unsaturated, branched or unbranched containing from about 8 to about 18, preferably from about 10 to about 16, carbon atoms. Preferably, the alkyl group is a straight chain saturated alkyl group. The alkyl group can contain up to 3 hydroxy groups and/or the polyalkyleneoxide chain can contain up to about 10, preferably less than 5, most preferably 0, alkyleneoxide moieties. Suitable alkyl polysaccharides are octyl, nonyldecyl, undecyldodecyl, tridecyl, tetradecyl, pentadecyl, hexadecyl, heptadecyl, and octadeyl, di-, tri-, tetra-, penta-, and hexaglucosides, galactosides, lactosides, glucoses, fructosides, fructoses, and/or galactoses. Suitable mixtures include coconut alkyl, di-, tri-, tetra-, and pentaglucosides and tallow alkyl tetra-, penta-, and hexaglucosides.

The preferred alkylpolyglycosides have the formula $$R^2O(C_nH_{2n}O)_t(\text{glycosyl})_x$$

wherein $R_2$ is selected from the group consisting of alkyl, alkylphenyl, hydroxyalkyl, hydroxyalkylphenyl, and mixtures thereof in which the alkyl groups contain from about 10 to about 18, preferably from about 12 to about 14, carbon atoms; n is 2 or 3, preferably 2; t is from 0 to about 10, preferably 0; and x is from 1½ to about 10, preferably from about 1½ to about 3, most preferably from about 1.6 to about 2.7. The glycosyl is preferably derived from glucose. To prepare these compounds, the alcohol or alkylpolyethoxy alcohol is formed first and then reacted with glucose, or a source of glucose, to form the glucoside (attachment at the 1-position). The additional glycosyl units can then be attached between their 1-position and the preceding glycosyl units 2-, 3-, 4- and/or 6-position, preferably predominately the 2-position.

7. Fatty acid amide detergent surfactants having the formula:

$$R^6-\overset{O}{\underset{\|}{C}}-NR^7_2$$

wherein $R^6$ is an alkyl group containing from about 7 to about 21 (preferably from about 9 to about 17) carbon atoms and each $R^7$ is selected from the group consisting of hydrogen, $C_1-C_4$ alkyl, $C_1-C_4$ hydroxyalkyl, and $-(C_2H_4O)_xH$ where x varies from about 1 to about 3. Preferred amides are $C_8-C_{20}$ ammonia amides, monoethanolamides, diethanolamides, and isopropanol amides.

B. Anionic Surfactants

Anionic surfactants suitable in detergent compositions of the present invention are generally disclosed in U.S. Pat. No. 3,929,678 to Laughlin et al., issued Dec. 30, 1975 at column 23, line 58 through column 29, line 23 (herein incorporated by reference). Classes of anionic surfactants included are:

1. Ordinary alkali metal soaps such as the sodium, potassium, ammonium and alkylolammonium salts of higher fatty acids containing from about 8 to about 24 carbon atoms, preferably from about 10 to about 20 carbon atoms.

2. Water-soluble salts, preferably the alkali metal, ammonium and alkylolammonium salts, of organic sulfuric reaction products having in their molecular structure an alkyl group containing from about 10 to about 20 carbon atoms and a sulfonic acid or sulfuric acid ester group. (Included in the term "alkyl" is the alkyl portion of acyl groups).

Examples of this group of anionic surfactants are the sodium and potassium alkyl sulfates, especially those obtained by sulfating the higher alcohols ($C_8-C_{18}$ carbon atoms) such as those produced by reducing the glycerides of tallow or coconut oil; and the sodium and potassium alkylbenzene sulfonates in which the alkyl group contains from about 9 to about 15 carbon atoms, in straight chain or branched chain configuration, e.g., those of the type described in U.S. Pat. Nos. 2,220,099 and 2,477,383. Especially valuable are linear straight chain alkylbenzene sulfonates in which the average number of carbon atoms in the alkyl group is from about 11 to 13, abbreviated as $C_{11}-C_{13}LAS$.

Preferred anionic surfactants of this type are the alkyl polyethoxylate sulfates, particularly those in which the alkyl group contains from about 10 to about 22, preferably from about 12 to about 18 carbon atoms, and wherein the polyethoxylate chain contains from about 1 to about 15 ethoxylate moieties preferably from about 1 to about 3 ethoxylate moieties. These anionic detergent surfactants are particularly desirable for formulating heavy-duty liquid laundry detergent compositions.

Other anionic surfactants of this type include sodium alkyl glyceryl ether sulfonates, especially those ethers of higher alcohols derived from tallow and coconut oil; sodium coconut oil fatty acid monoglyceride sulfonates and sulfates; sodium or potassium salts of alkyl phenol ethylene oxide ether sulfates containing from about 1 to about 10 units of ethylene oxide per molecule and wherein the alkyl groups contain from about 8 to about 12 carbon atoms; and sodium or potassium salts of alkyl ethylene oxide ether sulfates containing about 1 to about 10 units of ethylene oxide per molecule and wherein the alkyl group contains from about 10 to about 20 carbon atoms.

Also included are water-soluble salts of esters of alpha-sulfonated fatty acids containing from about 6 to 20 carbon atoms in the fatty acid group and from about 1 to 10 carbon atoms in the ester group; water-soluble salts of 2-acyloxy-alkane-1-sulfonic acids containing from about 2 to 9 carbon atoms in the acyl group and from about 9 to about 23 carbon atoms in the alkane moiety; alkyl ether sulfates containing from about 10 to 20 carbon atoms in the alkyl group and from about 1 to 30 moles of ethylene oxide; water-soluble salts of olefin sulfonates containing from about 12 to 24 carbon atoms; and beta-alkyloxy alkane sulfonates containing from about 1 to 3 carbon atoms in the alkyl group and from about 8 to 20 carbon atoms in the alkane moiety.

3. Anionic phosphate surfactants.

4. N-alkyl substituted succinamates.

C. Ampholytic Surfactants

Ampholytic surfactants can be broadly described as aliphatic derivatives of secondary or tertiary amines, or aliphatic derivatives of heterocyclic secondary and tertiary amines in which the aliphatic radical can be straight chain or branched and wherein one of the aliphatic substituents contains from about 8 to 18 carbon atoms and at least one contains an anionic water-solubilizing group, e.g. carboxy, sulfonate, sulfate. See U.S. Pat. No. 3,929,678 to Laughlin et al., issued Dec. 30, 1975 at column 19, lines 18-35 (herein incorporated by reference) for examples of ampholytic surfactants.

D. Zwitterionic Surfactants

Zwitterionic surfactants can be broadly described as derivatives of secondary and tertiary amines, derivatives of heterocyclic secondary and tertiary amines, or derivatives of quaternary ammonium, quaternary phosphonium or tertiary sulfonium compounds. See U.S. Pat. No. 3,929,678 to Laughlin et al., issued Dec. 30, 1975 at column 19, line 38 through column 22, line 48 (herein incorporated by reference) for examples of zwitterionic surfactants.

E. Cationic Surfactants

Cationic surfactants can also be included in detergent compositions of the present invention. Suitable cationic surfactants include the quaternary ammonium surfactants having the formula:

$$[R^2(OR^3)_y][R^4(OR^3)_y]_2R^5N^+X^-$$

wherein $R^2$ is an alkyl or alkyl benzyl group having from about 8 to about 18 carbon atoms in the alkyl chain; each $R^3$ is selected from the group consisting of $-CH_2CH_2-$, $-CH_2CH(CH_3)-$, $-CH_2CH(CH_2OH)-$, $-CH_2CH_2CH_2-$, and mixtures thereof; each $R^4$ is selected from the group consisting of $C_1-C_4$ alkyl, $C_1-C_4$ hydroxyalkyl, benzyl, ring structures formed by joining the two $R^4$ groups, $-CH_2CHOH-CHOHCOR^6CHOHCH_2OH$ wherein $R^6$ is any hexose or hexose polymer having a molecular weight less than about 1000, and hydrogen when y is not 0; $R^5$ is the same as $R^4$ or is an alkyl chain wherein the total number of carbon atoms of $R^2$ plus $R^5$ is not more than about 18; each y is from 0 to about 10 and the sum of the y values is from 0 to about 15; and X is any compatible anion.

Preferred of the above are the alkyl quaternary ammonium surfactants, especially the mono-long chain alkyl surfactants described in the above formula when $R^5$ is selected from the same groups as $R^4$. The most preferred quaternary ammonium surfactants are the chloride, bromide and methylsulfate $C_8-C_{16}$ alkyl trimethylammonium salts, $C_8-C_{16}$ alkyl di(hydroxyethyl)-methylammonium salts, the $C_8-C_{16}$ alkyl hydroxyethyl-dimethylammonium salts, and $C_8-C_{16}$ alkyloxypropyl trimethylammonium salts. Of the above, decyl trimethylammonium methylsulfate, lauryl trimethylammonium chloride, myristyl trimethylammonium bromide and coconut trimethylammonium chloride and methylsulfate are particularly preferred.

Other useful cationic surfactants are disclosed in U.S. Pat. No. 4,259,217 to Murphy, issued Mar. 31, 1981, herein incorporated by reference.

Detergent Builders

Detergent compositions of the present invention can optionally comprise inorganic or organic detergent builders to assist in mineral hardness control. When included, these builders typically comprise up to about 60% by weight of the detergent composition. Built liquid formulations preferably comprise from about 1 to about 25% by weight detergent builder, most preferably from about 3 to about 20% by weight, while built granular formulations preferably comprise from about 5 to about 50% by weight detergent builder, most preferably from about 10 to about 30% by weight.

Suitable detergent builders include crystalline aluminosilicate ion exchange materials having the formula:

$$Na_z[(AlO_2)_z \cdot (SiO_2)_y] \cdot xH_2O$$

wherein z and y are at least about 6, the mole ratio of z to y is from about 1.0 to about 0.5; and x is from about 10 to about 264. Amorphous hydrated aluminosilicate materials useful herein have the empirical formula $$M_z(zAlO_2 \cdot ySiO_2)$$

wherein M is sodium, potassium, ammonium or substituted ammonium, z is from about 0.5 to about 2; and y is 1; this material having a magnesium ion exchange capacity of at least about 50 milligram equivalents of $CaCO_3$ hardness per gram of anhydrous aluminosilicate.

The aluminosilicate ion exchange builder materials are in hydrated form and contain from about 10% to about 28% of water by weight if crystalline, and potentially even higher amounts of water if amorphous. Highly preferred crystalline aluminosilicate ion exchange materials contain from about 18% to about 22% water in their crystal matrix. The preferred crystalline aluminosilicate ion exchange materials are further characterized by a particle size diameter of from about 0.1 micron to about 10 microns. Amorphous materials are often smaller, e.g., down to less than about 0.01 micron. More preferred ion exchange materials have a particle size diameter of from about 0.2 micron to about 4 microns. The term "particle size diameter" represents the average particle size diameter of a given ion exchange material as determined by conventional analytical techniques such as, for example, microscopic determination utilizing a scanning electron microscope. The crystalline aluminosilicate ion exchange materials are usually further characterized by their calcium ion exchange capacity, which is at least about 200 mg. equivalent of $CaCO_3$ water hardness/g. of aluminosilicate, calculated on an anhydrous bais, and which generally is in the range of from about 300 mg. eq./g. to about 352 mg. eq./g. The aluminosilicate ion exchange materials are still further characterized by their calcium ion exchange rate which is at least about 2 grains $Ca^{++}$/gallon/minute/gram/gallon of aluminosilicate (anhydrous basis), and generally lies within the range of from about 2 grains/gallon/minute/gram/gallon to about 6 grains/gallon/minute/gram/gallon, based on calcium ion hardness. Optimum aluminosilicates for builder purposes exhibit a calcium ion exchange rate of at least about 4 grains/gallon/minute/gram/gallon.

The amorphous aluminosilicate ion exchange materials usually have a $Mg^{++}$ exchange capacity of at least about 50 mg. eq. $CaCO_3$/g. (12 mg. $Mg^{++}$/g.) and a $Mg^{++}$ exchange rate of at least about 1 grain/gallon/minute/gram/gallon. Amorphous materials do not exhibit an observable diffraction pattern when examined by Cu radiation (1.54 Angstrom Units).

Useful aluminosilicate ion exchange materials are commercially available. These aluminosilicates can be crystalline or amorphous in structure and can be naturally-occurring aluminosilicates or synthetically derived. A method for producing aluminosilicate ion exchange materials is disclosed in U.S. Pat. No. 3,985,669 to Krummel, et al. issued Oct. 12, 1976 (herein incorporated by reference). Preferred synthetic crystalline aluminosilicate ion exchange materials useful herein are available under the designations Zeolite A. Zeolite P (B), and Zeolite X. In an especially preferred embodiment, the crystalline aluminosilicate ion exchange material has the formula $$Na_{12}[(AlO_2)_{12}(SiO_2)_{12}] \cdot xH_2O$$

wherein x is from about 20 to about 30, especially about 27.

Other examples of detergency builders include the various water-soluble, alkali metal, ammonium or substituted ammonium phosphates, polyphosphates, phosphonates, polyphosphonates, carbonates, silicates, borates, polyhydroxysulfonates, polyacetates, carboxylates, and polycarboxylates. Preferred are the alkali metal, especially sodium, salts of the above.

Specific examples of inorganic phosphate builders are sodium and potassium tripolyphosphate, pyrophosphate, polymeric metaphate having a degree of polymerization of from about 6 to 21, and orthophosphate. Examples of polyphosphonate builders are the sodium and potassium salts of ethylene-1,1-diphosphonic acid, the sodium and potassium salts of ethane 1-hydroxy-1,1-diphosphonic acid and the sodium and potassium salts of ethane, 1,1,2-triphosphonic acid. Other phosphorus builder compounds are disclosed in U.S. Pat. Nos. 3,159,581; 3,213,030; 3,422,021; 3,422,137; 3,400,176 and 3,400,148 (all herein incorporated by reference).

Examples of nonphosphorus, inorganic builders are sodium and potassium carbonate, bicarbonate, sesquicarbonate, tetraborate decahydrate, and silicate having a mole ratio of $SiO_2$ to alkali metal oxide of from about 0.5 to about 4.0, preferably from about 1.0 to about 2.4.

Useful water-soluble, nonphosphorus organic builders include the various alkali metal, ammonium and substituted ammonium polyacetates, carboxylates, polycarboxylates and polyhydroxysulfonates. Examples of polyacetate and polycarboxylate builders are the sodium, potassium, lithium, ammonium and substituted ammonium salts of ethylenediamine tetraacetic acid, nitrilotriacetic acid, oxydisuccinic acid, mellitic acid, benzene polycarboxylic acids, citric acid, and 2-hydroxyethyl ethylenediamine triacetic acid.

Highly preferred polycarboxylate builders are disclosed in U.S. Pat. No. 3,308,067 to Diehl, issued Mar. 7, 1967 (herein incorporated by reference). Such materials include the water-soluble salts of homo- and copolymers of aliphatic carboxylic acids such as maleic acid, itaconic acid, mesaconic acid, fumaric acid, aconitic acid, citraconic acid and methylenemalonic acid.

Other builders include the carboxylated carbohydrates disclosed in U.S. Pat. No. 3,723,322 to Diehl issued Mar. 28, 1973 (herein incorporated by reference).

Other useful builders are sodium and potassium carboxymethyloxymalonate, carboxymethyloxysuccinate, cis-cyclohexanehexacarboxylate, cis-cyclopentanetetracarboxylate phloroglucinol trisulfonate, water-soluble polyacrylates (having molecular weights of from about 2,000 to about 200,000 for example), and the copolymers of maleic anhydride with vinyl methyl ether or ethylene.

Other suitable polycarboxylates are the polyacetal carboxylates disclosed in U.S. Pat. No. 4,144,226, to Crutchfield et al. issued Mar. 13, 1979, and U.S. Pat. No. 4,246,495, to Crutchfield et al., issued Mar. 27, 1979 (both herein incorporated by reference). These polyacetal carboxylates can be prepared by bringing together under polymerization conditions an ester of glyoxylic acid and a polymerization initiator. The resulting polyacetal carboxylate ester is then attached to chemically stable end groups to stabilize the polyacetal carboxylate against rapid depolymerization in alkaline solution, converted to the corresponding salt, and added to a surfactant.

Clay Soil Removal/Anti-Redeposition Agents

Laundry detergent compositions of the present invention desirably include a clay soil removal and/or anti-redeposition agent. These clay soil removal/anti-redeposition agents are usually included at from about 0.1 to about 10% by weight of the composition. In terms of the benefits achieved, preferred detergent compositions can comprise from about 0.5 to about 5% by weight of these agents. Typically, these preferred compositions comprise from about 1 to about 3% by weight of these agents.

One group of preferred clay soil removal/anti-redeposition agents are the ethoxylated amines disclosed in European patent application No. 112,593 to James M. Vander Meer, published July 4, 1984, herein incorporated by reference. These ethoxylated amines are selected from the group consisting of:

(1) ethoxylated monoamines having the formula:

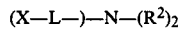

(2) ethoxylated diamines having the formula:

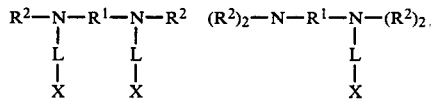

or

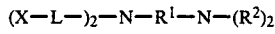

(3) ethoxylated polyamines having the formula:

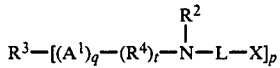

(4) ethoxylated amine polymers having the general formula:

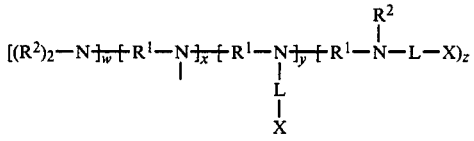

and (5) mixtures thereof; wherein $A^1$ is

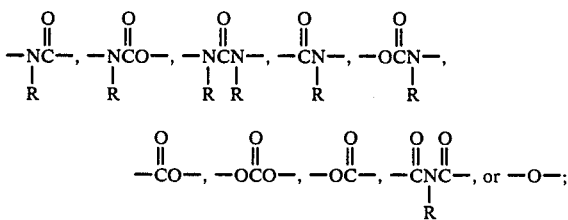

R is H or $C_1$-$C_4$ alkyl or hydroxyalkyl; $R^1$ is $C_2$-$C_{12}$ alkylene, hydroxyalkylene, alkenylene, arylene or alkarylene, or a $C_2$-$C_3$ oxyalkylene moiety having from 2 to about 20 oxalkylene units provided that no O—N bonds are formed; each $R^2$ is $C_1$-$C_4$ alkyl or hydroxyalkyl, the moiety —L—X, or two R² together form the moiety —(CH₂)ᵣ—A²—(CH₂)ₛ—, wherein A² is —O— or —CH₂—, r is 1 or 2, s is 1 or 2, and r+s is 3 or 4; X is a nonionic group, an anionic group or mixture thereof; R³ is a substituted $C_3$-$C_{12}$ alkyl, hydroxyalkyl, alkenyl, aryl, or alkaryl group having p substitution sites; R⁴ is $C_1$-$C_{12}$ alkylene, hydroxyalkylene, alkenylene, arylene or alkarylene, or a $C_2$-$C_3$ oxyalkylene moiety having from 2 to about 20 oxyalkylene units provided that no O—O or O—N bonds are formed; L is a hydrophilic chain which contains the polyoxalkylene moiety —[(R⁵O)ₘ(CH₂CH₂O)ₙ]—, wherein R⁵ is $C_3$-$C_4$ alkylene or hydroxyalkylene and m and n are numbers such that the moiety —(CH₂CH₂O)— comprises at least about 50% by weight of said polyoxyalkylene moiety; for said monoamines, m is from 0 to about 4, and n is at least about 12; for said diamines, m is from 0 to about 3, and n is at least about 6 when R¹ is $C_2$-$C_3$ alkylene, hydroxyalkylene, or alkenylene, and at least about 3 when R¹ is other than $C_2$-$C_3$ alkylene, hydroxyalkylene or alkenylene; for said polyamines and amine polymers, m is from 0 to about 10 and n is at least about 3; p is from 3 to 8; q is 1 or 0; t is 1 or 0, provided that t is 1 when q is 1; w is 1 or 0; x+y+z is at least 2; and y+z is at least 2.

Another group of preferred clay soil removal/anti-redeposition agents are the cationic compounds disclosed in European patent application No. 111,965 to Young S. Oh and Eugene P. Gosselink, published June 27, 1984, herein incorporated by reference. These cationic compounds are selected from the group consisting of:

(1) ethoxylated cationic monoamines having the formula:

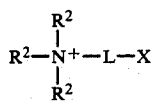

(2) ethoxylated cationic diamines having the formula:

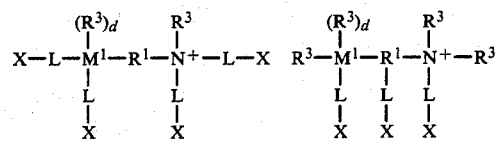

or

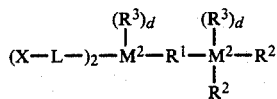

wherein M¹ is an N⁺ or N group; each M² is an N⁺ or N group, and at least one M² is an N⁺ group;

(3) ethoxylated cationic polyamines having the formula:

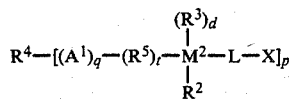

(4) ethoxylated cationic polymers which comprise a polymer backbone, at least 2M groups and at least one L—X group, wherein M is a cationic group attached to or integral with the backbone and contains an N⁺ positively charged center; and L connects groups M and X or connects group X to the polymer backbone; and (5) mixtures thereof; wherein A¹ is

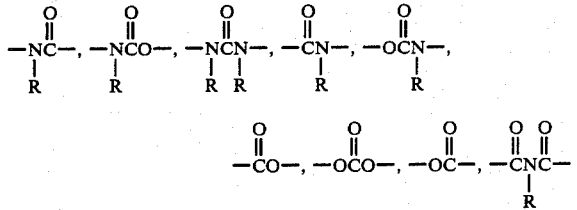

or —O—, R is H or $C_1$-$C_4$ alkyl or hydroxyalkyl, R¹ is $C_2$-$C_{12}$ alkylene, hydroxyalkylene, alkenylene, arylene or alkarylene, or a $C_2$-$C_3$ oxyalkylene moiety having from 2 to about 20 oxyalkylene units provided that no O—N bonds are formed; each R² is $C_1$-$C_4$ alkyl or hydroxyalkyl, the moiety —L—X or two R² together form the moiety —(CH₂)ᵣ—A²—(CH₂)ₛ—, wherein A² is —O— or —CH₂—, r is 1 or 2, s is 1 or 2 and r+s is 3 or 4; each R³ is $C_1$-$C_8$ alkyl or hydroxyalkyl, benzyl, the moiety —L—X, or two R³ or one R² and one R³ together form the moiety —(CH₂)ᵣ—A²—(CH₂)ₛ—; R⁴ is a substituted $C_3$-$C_{12}$ alkyl, hydroxyalkyl, alkenyl, aryl or alkaryl group having p substitution sites; R⁵ is $C_1$-$C_{12}$ alkylene, hydroxyalkylene, alkenylene, arylene or alkarylene, or a $C_2$-$C_3$ oxyalkylene moiety having from 2 to about 20 oxyalkylene units provided that no O—O or O—N bonds are formed; X is a nonionic group selected from the group consisting of H, $C_1$-$C_4$ alkyl or hydroxyalkyl ester or ether groups, and mixtures thereof; L is a hydrophilic chain which contains the polyoxyalkylene moiety —[(R⁶O)ₘ(CH₂CH₂O)ₙ]—; wherein R⁶ is $C_3$-$C_4$ alkylene or hydroxyalkylene and m and n are numbers such that the moiety —(CH₂CH₂O)— comprises at least about 50% by weight of said polyoxyalkylene moiety; d is 1 when M² is N⁺ is O when M² is N; n is at least about 12 for said cationic monoamines, is at least about 6 for said cationic diamines and is at least about 3 for said cationic polyamines and cationic polymers; p is from 3 to 8; q is 1 or 0; and t is 1 or 0, provided that t is 1 when q is 1.

Other clay soil removal/anti-redeposition agents which can be used include the ethoxylated amine polymers disclosed in European patent application No. 111,984 to Eugene P. Gosselink, published June 27, 1984; the zwitterionic compounds disclosed in European patent application No. 111,976 to Donn N. Rubingh and Eugene P. Gosselink, published June 27, 1984; the zwitterionic polymers disclosed in European patent application No. 112,592 to Eugene P. Gosselink, published July 4, 1984; and the amine oxides disclosed in U.S. Pat. No. 4,548,774 to Connor, issued Oct. 22, 1985, all of which are incorporated by reference.

Other Optional Detergent Ingredients

Other optional ingredients which can be included in detergent compositions of the present invention, in their conventional art-established levels for use (i.e., from 0 to about 20%), include solvents, bleaching agents, bleach activators, other soil-suspending agents, corrosion inhibitors, dyes, fillers, optical brighteners, germicides, pH adjusting agents (monoethanolamine, sodium carbonate, sodium hydroxide, etc.), enzymes, enzyme-stabilizing agents, perfumes, fabric softening components, static control agents, and the like.

General Detergent Formulations

Except for the previously described enrobing of the soil release compound, granular formulations embodying the detergent compositions of the present invention can be formed by conventional techniques, i.e., by slurrying the individual components in water and then atomizing and spray-drying the resultant mixture, or by pan or drum granulation of the ingredients. Granular formulations preferably comprise from about 10 to about 30% detergent surfactant, usually anionic, and most preferably about 15 to about 25% surfactant.

Liquid formulations embodying the detergent compositions can be built or unbuilt. If unbuilt, these compositions conventionally contain approximately 15 to 50% (preferably 20 to 35%) total surfactant, from 0 to 5% (preferably from 0 to 2%) of an organic base such as a mono-, di-, or tri-alkanol amine, a neutralization system such as an alkali metal hydroxide and a lower primary alcohol such as ethanol or isopropanol, and approximately 20 to 80% water.

Built liquid detergent compositions can be in the form of single phase liquids provided that the builder is solubilized in the mixture at its level of use. Such liquids conventionally contain 10 to 40% (preferably 15 to 25%) total surfactant, 1 to 25% (preferably 3 to 20%) builder which can be organic or inorganic, up to 10% of a hydrotrope system, and 20 to 80% water. Built liquid detergents incorporating components that form heterogeneous mixtures (or levels of builder that cannot be completely dissolved) can also comprise detergent compositions of the present invention. Such liquids conventionally employ viscosity modifiers to produce systems having plastic shear characteristics to maintain stable dispersions and to prevent phase separation or solid settlement. Care should also be taken to avoid exposing the soil release compounds to highly alkaline environments, e.g. those above a pH of about 8.5, during processing of the liquid detergent formulation.

A description of some preferred detergent formulations is as follows:

A. Near Neutral Wash pH Detergent Formulations

While the detergent compositions of the present invention are operative within a wide range of wash pHs, they are particularly suitable when formulated to provide a near neutral wash pH, i.e. an initial pH of from about 6.0 to about 8.5 at a concentration of from 0.1 to about 2% by weight in water at 20° C. Near neutral wash pH formulations are better for enzyme stability and for preventing stains from setting. The near neutral pH of such formulations is also desirable to insure long term activity for the soil release compounds, especially those having shorter backbones. In such formulations, the product pH is preferably from about 7.0 to about 8.5, and more preferably from about 7.5 to about 8.0.

Preferred near neutral wash pH detergent formulations are disclosed in U.S. Pat. No. 4,561,998 to Wertz et al, issued Dec. 31, 1985, herein incorporated by reference. These preferred formulations comprise:

(a) from about 2 to about 60% (preferably from about 10 to about 25%) by weight of an anionic synthetic surfactant as previously defined;

(b) from 0 to about 12% (preferably from about 0.5 to about 4%) by weight of a cosurfactant selected from the group consisting of:

(i) quaternary ammonium surfactants having the formula:

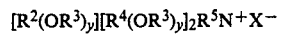

wherein $R^2$, each $R^3$, $R^4$, $R^5$, X and y are as previously defined;

(ii) diquaternary ammonium surfactants having the formula:

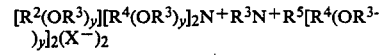

wherein $R^2$, $R^3$, $R^4$, y and X are as defined above; particularly preferred are the $C_8$–$C_{16}$ alkyl pentamethylethylenediamine chloride, bromide and methylsulfate salts;

(iii) amine surfactants having the formula:

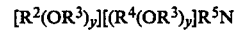

wherein $R^2$, $R^3$, $R^4$, $R^5$ and y are as defined above; particularly preferred are the $C_{12}$–$C_{16}$ alkyl dimethyl amines;

(iv) diamine surfactants having the formula:

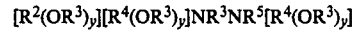

wherein $R^2$, $R^3$, $R^4$, $R^5$ and y are as defined above; particularly preferred are the $C_{12}$–$C_{16}$ alkyl dimethyl diamines;

(v) amine oxide surfactants having the formula:

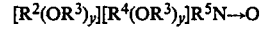

wherein $R^2$, $R^3$, $R^4$, $R^5$ and y are as defined above; particularly preferred are the $C_{12}$–$C_{16}$ alkyldimethyl amine oxides; and (vi) di(amine oxide) surfactants having the formula:

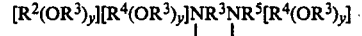

wherein $R^2$, $R^3$, $R^4$, $R^5$ and y are as defined above; preferred are the $C_{12}$–$C_{16}$ alkyl trimethylethylene di(amine oxides) and (c) from 0 to about 40% by weight (preferably 5 to about 30% by weight, and most preferably from about 10 to 20% by weight) of a fatty acid containing from about 10 to about 22 carbon atoms (preferably a $C_{10}$–$C_{14}$ saturated fatty acid or mixtures thereof); the mole ratio of the anionic surfactant to the cosurfactant being at least 1 and preferably from about 2:1 to about 20:1.

Such compositions also preferably contain from about 3 to about 15% by weight of an ethoxylated alcohol or ethoxylated alkyl phenol (nonionic surfactants) as previously defined. Highly preferred compositions of this type also preferably contain from about 2 to about 10% by weight (preferably from about 3 to about 8% by weight) of a water-soluble polycarboxylate builder (preferably citric acid) and minor amounts (e.g., less than about 20% by weight) of neutralizing agents, buffering agents, phase regulants, hydrotropes, enzymes, enzyme stabilizing agents, polyacids, suds regulants, opacifiers, antioxidants, bactericides, dyes, perfumes and brighteners, such as those described in U.S. Pat. No. 4,285,841 to Barrat et al., issued Aug. 25, 1981 (herein incorporated by reference).

B. Detergent Formulations Containing Certain Anionic Surfactants

When high levels of certain anionic detergent surfactants are used, the compounds of the present invention may not deposit as well on the fabric during laundering. See U.S. Pat. No. 4,116,885 to Derstadt et al., issued Sept. 26, 1978, which describes the incompatibility of ethylene terphthalate/PEG terephthalate soil release polyesters with certain anionic detergent surfactants. These anionic surfactants include the alkyl sulfates and particularly the alkyl benzene sulfonates. Inclusion of certain detergent builders such sodium tripolyphosphonate, alkali metal carbonates and aluminosilicate ion exchange materials in such anionic detergent formulations further reduces the soil release activity of the compounds.

This decreased performance can be offset by inclusion of higher levels of nonionic detergent surfactant, i.e. above about 50% by weight of the surfactant system. However, higher levels of nonionic surfactants do not provide as good cleaning as anionic surfactants, especially in granular detergent formulations. Accordingly, inclusion of a small amount (e.g. from about 0.5 to about 2% by weight of the total composition) of a cationic detergent surfactant(s) as previously described can be used to improve the soil release performance of the compounds. Also, soil release performance can be boosted by simply including more of the compounds of the present invention.

SPECIFIC EMBODIMENTS OF DETERGENT COMPOSITIONS ACCORDING TO THE PRESENT INVENTION

Embodiment I

The following embodiments illustrate, but are not limiting of, detergent compositions of the present invention:

A granular detergent composition is as follows:

| Component | Wt. % |
|---|---|
| Polyester of Example 1* | 2.0 |
| Sodium $C_{14}$-$C_{15}$ alkylethoxysulfate | 10.7 |
| $C_{13}$ linear alkyl benzene sulfonic acid | 4.3 |
| $C_{12}$-$C_{14}$ alkylpolyethoxylate (6) | 0.5 |
| $C_{12}$ alkyltrimethyl ammonium chloride | 0.5 |
| Sodium toluene sulfonate | 1.0 |
| Sodium tripolyphosphate | 32.9 |
| Sodium carbonate | 20.3 |
| Sodium silicate | 5.8 |
| Minors and water | Balance to 100 |

*Enrobed in PEG having an average M.W. 8,000.

Except for the enrobed polyester particles, the components are added together with continuous mixing to form an aqueous slurry which is then spray dried to form granules. The enrobed polyester particles are then mixed with the granules to form the composition.

Embodiment II

A liquid detergent composition is formulated as follows:

| Component | Wt. % |
|---|---|
| Polyester of Example 2 | 1.0 |
| PEA$_{189}$E$_{17}$* | 1.0 |
| Sodium $C_{12}$ alkylethoxy (1) sulfate | 9.4 |
| $C_{12}$-$C_{13}$ alcohol polyethoxylate (6.5) | 21.5 |
| Ethanol | 7.5 |
| Sodium diethylenetriamine pentaacetate | 0.2 |
| MAXATASE | 0.026 Anson units/g |
| TERMAMYL | 0.51 KNu/g |
| Sodium formate | 1.6 |
| Calcium formate | 0.1 |
| Minors and water | Balance to 100 |

*Polyethyleneamine having M.W. of 189 and degree of ethoxylation of 17 at each reactive hydrogen.

The components are added together with continuous mixing to form the composition.

Embodiments III and IV

Liquid detergent compositions are as follows:

| Component | Wt. % III | Wt. % IV |
|---|---|---|
| Polyester of Example 2 | 1.0 | 1.0 |
| PEA$_{189}$E$_{17}$ | 2.0 | 1.5 |
| $C_{14}$-$C_{15}$ alkylpolyethoxy (2.25) sulfuric acid | 12.0 | 10.8 |
| $C_{13}$ linear alkylbenzene sulfonic acid | 8.0 | 8.0 |
| $C_{12}$ alkyl trimethylammonium chloride | 0.6 | 1.2 |
| $C_{12}$-$C_{13}$ alcohol polyethoxylate (6.5) | 5.0 | 6.5 |
| Coconut fatty acid | 10.0 | 13.0 |
| Oleic acid | — | 2.0 |
| Citric acid monohydrate | 4.0 | 4.0 |
| Diethylenetriamine pentaacetic acid | 0.2 | 0.2 |
| Protease enzyme | 0.8 | 0.8 |
| Amylase enzyme | 0.2 | 0.2 |
| Monoethanolamine | 2.0 | 2.0 |
| Sodium hydroxide | 2.4 | 1.7 |
| Potassium hydroxide | 1.1 | 2.7 |
| 1,2-Propanediol | 3.5 | 7.3 |
| Ethanol | 8.5 | 7.8 |
| Formic acid | 0.08 | 0.7 |
| Boric acid | 1.3 | |
| Calcium ion | 0.03 | 0.03 |
| Minors and water | Balance to 100 | |

Embodiment III is prepared by adding the components together with continuous mixing, in the following order to produce a clear liquid: a paste premix of alkylbenzene sulfonic acid, a portion of the sodium hydroxide, propylene glycol, and a portion of the ethanol; a paste premix of alkylpolyethoxysulfuric acid, a portion of the sodium hydroxide and a portion of the ethanol; pentaacetic acid; a portion of the alcohol polyethoxylate; a premix of water, triethanolamine, brighteners and the remainder of the alcohol polyethoxylate; the remaining ethanol; potassium hydroxide and the remaining sodium hydroxide; citric acid; fatty acid; formic acid, boric acid and calcium; alkyl trimethylammonium chloride; PEA$_{189}$E$_{17}$ (50% aqueous solution); polyester of Example 1; adjust to pH 8.0; and balance of components. Embodiment IV can be prepared in a similar manner.

What is claimed is:

1. An ester compound having branched hydrophilic capping groups and oligomer or polymer backbone, said compound having the formula:

$$X + (OCH_2CH(Y))_n(OR^5)_m +$$

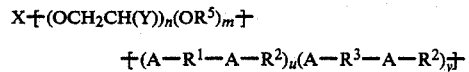

-continued

—A—R⁴—A—[(R⁵O)$_m$(CH(Y)CH$_2$O)$_n$]—X wherein the A moieties are selected from the group consisting of

and combinations thereof with either or both of the moieties

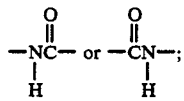

the R¹ moieties are selected from 1,4-phenylene moieties and combinations thereof with other arylene moieties selected from 1,3-phenylene, 1,2-phenylene, 1,8-napthylene, 1,4-napthylene, 2,2'-biphenylene, 4,4'-biphenylene and mixtures thereof; the R² moieties are selected from ethylene, 1,2-propylene, 1,2-butylene, 1,2-hexylene and 3-methoxy-1,2-propylene moieties and mixtures thereof; the R³ moieties are substituted C$_2$–C$_{18}$ hydrocarbylene moieties having at least one —SO$_3$M, —COOM, —O—[(R⁵O)$_m$(CH(Y)CH$_2$O)$_n$]—X or —A—[(R²—A—R⁴—A)]$_w$[(R⁵O)$_m$(CH(Y)CH$_2$O)$_n$]—X substituent or at least one moiety —A—[(R²—A—R⁴—A)]$_w$R²—A— cross-linked to another R³ moiety; the R⁴ moieties are R¹ or R³ moieties, or a mixture thereof; each R⁵ is C$_3$–C$_4$ alkylene, or the moiety —R²—A—R⁶—, wherein R⁶ is a C$_1$–C$_{12}$ alkylene, alkenylene, arylene or alkarylene moiety; each M is H or a water-soluble cation; the Y substituents of each moiety —[(R⁵O)$_m$(CH(Y)CH$_2$O)$_n$]— are the ether moiety —CH$_2$(OCH$_2$CH$_2$)$_p$O—X or mixture of said ether moiety and H; each X is H, C$_1$–C$_4$ alkyl or

wherein R⁷ is C$_1$–C$_4$ alkyl; m and n are numbers such that the moiety —(CH(Y)CH$_2$O)— comprises at least about 50% by weight of the moiety —[(R⁵O)$_m$(CH(Y)CH$_2$O)$_n$]—, provided that when R⁵ is the moiety —R²—A—R⁶—, m is 1; each n is at least about 6; p is 0 or at least 1; u and v are numbers such that the sum of u+v is from about 3 to about 25 when w is 0; w is 0 or at least 1; and when w is at least 1, u, v and w are numbers such that the sum of u+v+w is from about 3 to about 25.

2. The compound of claim 1, wherein each A is

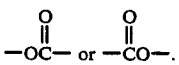

3. The compound of claim 2, wherein said R¹ moieties comprise from about 50 to 100% of said 1,4-phenylene moieties.

4. The compound of claim 3, wheren each R¹ moiety is a 1,4-phenylene moiety.

5. The compound of claim 2, wherein said R³ moieties are selected from the group consisting of substituted C$_2$–C$_{12}$ alkylenes, alkenylenes, arylenes, alkarylenes and mixtures thereof.

6. The compound of claim 5, wherein each of said R³ moieties has only one —SO$_3$M substituent.

7. The compound of claim 2, wherein v is 0.

8. The compound of claim 7, wherein said R² moieties comprise from about 20 to 100% of said ethylene, or substituted ethylene moieties.

9. The compound of claim 8, wherein said R² moieties comprise from about 80 to 100% of said ethylene, or substituted ethylene moieties.

10. The compound of claim 7, wherein said R² moieties comprise from about 20 to 100% ethylene moieties, 1,2-propylene moieties or mixtures thereof.

11. The compound of claim 7 wherein the Y substituents are a mixture of said ether moiety and H.

12. The compound of claim 11 wherein p is 0.

13. The compound of claim 12, wherein m is 0 and each n is from about 12 to about 119.

14. The compound of claim 13, wherein each n is from about 12 to about 45.

15. An ester compound having branched hydrophilic capping groups and oligomer or polymer backbone, said compound having the formula:

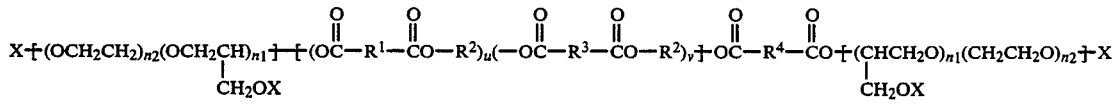
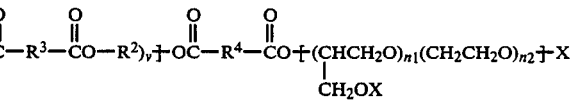

wherein each R¹ moiety is a 1,4-phenylene moiety; the R² moieties are ethylene moieties, 1,2-propylene moieties or mixtues thereof; the R³ moieties are potassium or sodium 5-sulfo-1,3-phenylene moieties or substituted 1,3-phenylene moieties having the substituent

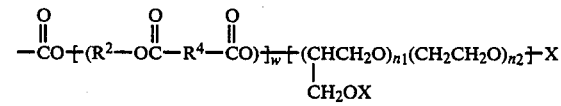

at the 5 position; the R⁴ moieties are R¹ or R³ moieties, or a mixture thereof; each X is ethyl or methyl; each n$_1$ is from 1 to about 5; the sum of each n$_1$+n$_2$ is from about 12 to about 45; when w is 0, u+v is from about 3 to about 10; when w is at least 1, u+v+w is from about 3 to about 10.

16. The polyesters of claim 15, wherein v is 0.

17. The polyesters of claim 16, wherein said R² moieties comprise from about 80 to 100% of said ethylene moieties, 1,2-propylene moieties, or mixtures thereof.

18. A detergent composition which comprises:
(a) from about 1 to about 75% by weight of a nonionic, anionic, ampholytic, zwitterionic, or cationic detergent surfactant, or mixture thereof; and
(b) a soil release component which comprises an effective amount of an ester compounds having branched hydrophilic capping groups and oligomer or polymer backbone, said compound having the formula:

-continued

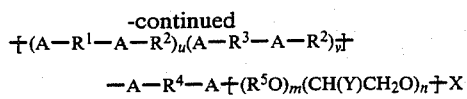

$$-A-R^4-A-[(R^5O)_m(CH(Y)CH_2O)_n]-X$$

wherein the A moieties are selected from the group consisting of

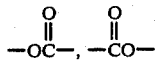

and combinations thereof with either or both of the moieties

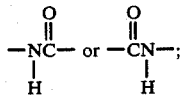

the $R^1$ moieties are selected from 1,4-phenylene moieties and combinations thereof with other arylene moieties selected from 1,3-phenylene, 1,2-phenylene, 1,8-napthylene, 1,4-napthylene, 2,2'-biphenylene, 4,4'-biphenylene and mixtures thereof; the $R^2$ moieties are selected from ethylene, 1,2-propylene, 1,2-butylene, 1,2-hexylene and 3-methoxy-1,2-propylene moieties and mixtures thereof; the $R^3$ moieties are substituted $C_2$–$C_{18}$ hydrocarbylene moieties having at least one $-SO_3M$, $-COOM$, $-O-[(R^5O)_m(CH(Y)CH_2O)_n]-X$ or $-A-[(R^2-A-R^4-A)_w(R^5O)_m(CH(Y)CH_2O)_n]X$ substituent or at least one moiety $-A-[(R^2-A-R^4-A)_w]R^2-A-$ cross-linked to another $R^3$ moiety; the $R^4$ moieties are $R^1$ or $R^3$ moieties, or a mixture thereof; each $R^5$ is $C_3$–$C_4$ alkylene, or the moiety $-R^2-A-R^6-$, wherein $R^6$ is a $C_1$–$C_{12}$ alkylene, alkenylene, arylene or alkarylene moiety; each M is H or a water-soluble cation; the Y substituents of each moiety $-[(R^5O)_m(CH(Y)CH_2O)_m]$ are the ether moiety $-CH_2(OCH_2CH_2)_pO-X$ or mixture of said ether moiety and H; each X is H, $C_1$–$C_4$ alkyl or

wherein $R^7$ is $C_1$–$C_4$ alkyl; m and n are numbers such that the moiety $-(CH(Y)CH_2O)-$ comprises at least about 50% by weight of the moiety $-[(R^5O)_m(CH(Y)CH_2O)_n]-$, provided that when $R^5$ is the moiety $-R^2-A-R^6-$, m is 1; each n is at least about 6; p is 0 or at least 1; u and v are numbers such that the sum of u+v is from about 3 to about 25 when w is 0; w is 0 or at least 1; and when w is at least 1, u, v and w are numbers such that the sum of u+v+w is from about 3 to about 25.

19. The composition of claim 18, wherein each A is

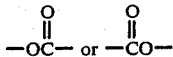

and wherein said soil release compound comprises from about 0.1 to about 10% by weight of the composition.

20. The composition of claim 19, wherein said $R^1$ moieties comprise from about 50 to 100% of said 1,4-phenylene moieties.

21. The composition of claim 20, wherein each $R^1$ moiety is a 1,4-phenylene moiety.

22. The composition of claim 21, wherein each $R^3$ moiety is a sodium or potassium 5-sulfo-1,3-phenylene moiety.

23. The composition of claim 21, wherein v is 0.

24. The composition of claim 23, wherein said $R^2$ moieties are ethylene moieties, 1,2-propylene moieties or mixtures thereof.

25. The composition of claim 24 wherein said $R^2$ moieties comprise from about 20 to 100% of said ethylene moieties, 1,2-propylene moieties or mixtures thereof.

26. The composition of claim 25, wherein said $R^2$ moieties comprise from about 80 to 100% of said ethylene moieties, 1,2-propylene moieties or mixtures thereof.

27. The compositions of claim 25, wherein u is from about 3 to about 10.

28. The compositions of claim 27 wherein the Y substituents are a mixture of said ether moiety and H; and p is 0.

29. The compositions of claim 28, wherein m is 0 and each n is from about 12 to about 45.

30. The composition of claim 29, wherein said soil release compound comprises from about 0.1 to about 5% by weight of the composition.

31. The composition of claim 29, wherein said detergent surfactant comprises from about 10 to about 50% by weight of the composition.

32. The composition of claim 31, wherein said detergent surfactant comprises a nonionic surfactant, an anionic surfactant or a mixture thereof.

33. The composition of claim 31, which further comprises from about 3 to about 20% by weight of the composition of a detergent builder.

34. The composition of claim 31, which further comprises from about 20 to about 30% by weight of the composition of a detergent builder.

35. The composition of claim 31, which further comprises an optical brightener.

* * * * *